Jan. 27, 1959  J. A. POKRYFKE  2,871,083
STORAGE CABINET FOR FIRE HOSE
Filed June 4, 1956
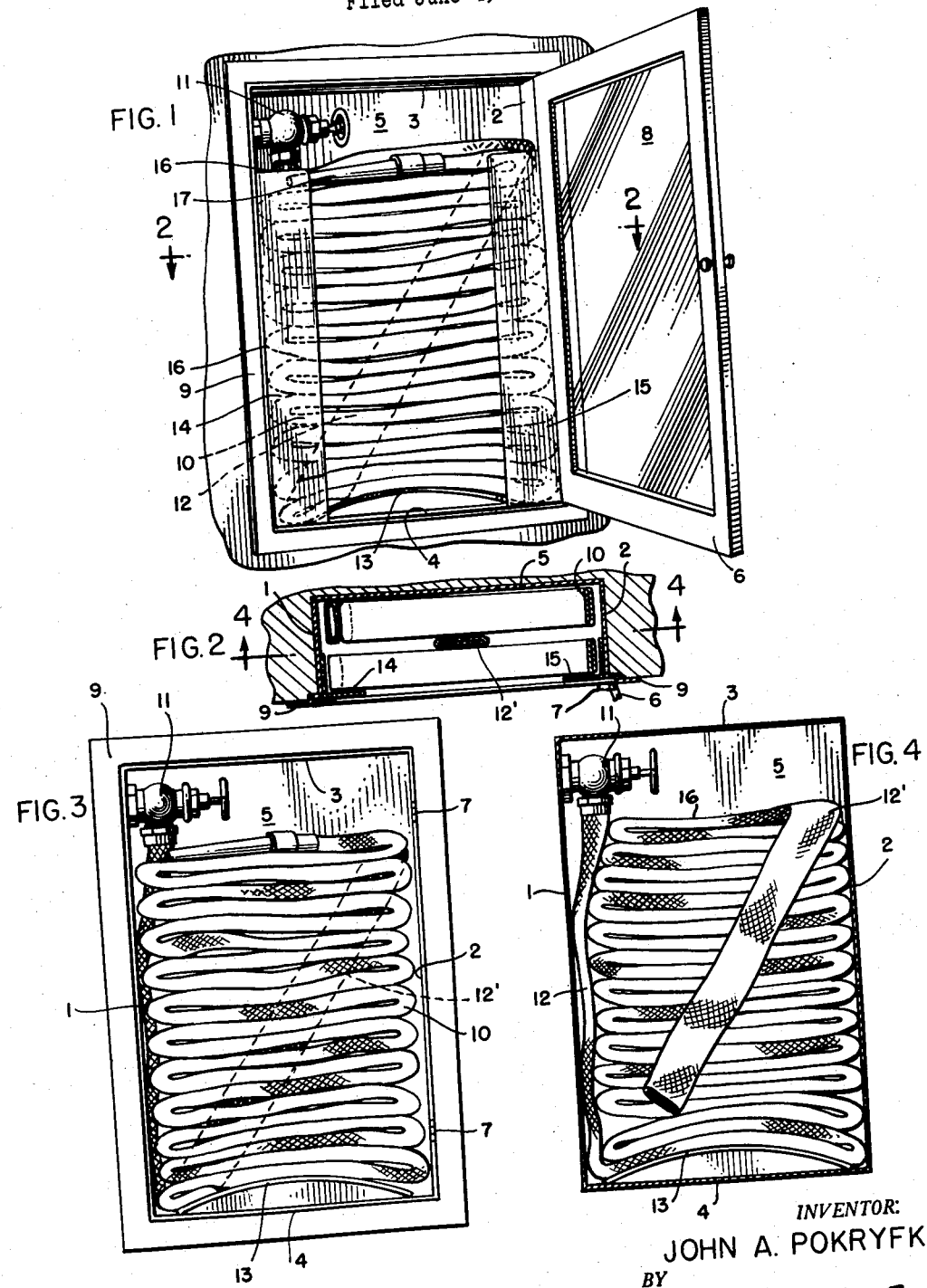
INVENTOR:
JOHN A. POKRYFKE
BY
Mazgell, Johnston, Cook & Root.
ATT'YS

2,871,083
STORAGE CABINET FOR FIRE HOSE
John A. Pokryfke, Chicago, Ill., assignor to W. D. Allen Manufacturing Co., Chicago, Ill., a corporation of Illinois Application June 4, 1956, Serial No. 589,120
1 Claim. (Cl. 312—242)

This invention relates to fire hoses in general, and particularly to means and methods for storing the same.

The present invention consists generally of a new and improved cabinet for holding and storing a fire hose in flat horizontal position to prevent creases or sharp bends at the points where the hose is folded. The cabinet is mounted vertically on a wall and is so constructed to include the usual valve, or other suitable water connection arranged therein. The cabinet includes means for supporting the hose horizontally permitting the hose, preferably arranged in two vertical tiers, to be easily and quickly pulled out of the cabinet door without hindrance and without any kinks from occurring during the removal of the hose from the cabinet.

Heretofore, fire hoses ordinarily have been stored in cabinets, or on reels, with the hose disposed in vertical folds is festoon manner, the upper folds being supported by pins which are released from a support during removal of the hose. The supporting structure for conventional vertically folded fire hose usually consists of a swivel rack with parallel grooves for receiving the hose supporting pins. If a rubber-lined fire hose is stored in a cabinet in that manner for any substantial length of time, the weight causes the hose to become flattened and permanently creased at the points where the supporting pins support the hose folds. The rubber of the hose lining thus may become permanently flattened and deformed and the rubber lining may become permanently stuck together, and the hose may break or crack when straightened out, particularly when the hose is subjected to water pressure.

An important object of this invention is to provide a hose cabinet wherein the hose may rest in horizontal folds, and in one or more vertical layers of folds, the hose being impositively retained within the cabinet, and in the vertical layers thereof, by flanges projecting inwardly from the sides of the cabinet such that the hose may be quickly withdrawn therefrom.

Another important object resides in the provision of a method for storing a fire hose in horizontal folds such that the weight of each span or length of folds will not rest upon the folded portion thereof but may rest across the entire span upon the length of hose thereunder.

A further object of this invention is to provide a cabinet for storing a fire hose wherein the hose is supported in folds and impositively retained in the cabinet by inwardly projecting flanges, and wherein the center portions of the folds are supported at a higher level than are the end portions such that the center portions may rest compactly one on the other while the ends thereof may be loosely folded to prolong the life of the hose and particularly to avoid creasing and damaging the hose and the rubber lining thereof.

A more complete understanding of the present invention, its mode of operation, and its advantages, may be gathered from further reading of this specification, together with an inspection of the accompanying drawing in which:

Fig. 1 is a perspective view of the fire hose cabinet of this invention as it may be mounted in a wall, the door of the cabinet being swung to open position;

Fig. 2 is a horizontal sectional view on the line 2—2 of Fig. 1;

Fig. 3 is a front elevational view of the cabinet with the side flanges and the door omitted; and Fig. 4 is a detail vertical sectional view on the line 4—4 of Fig. 2.

The fire hose storage cabinet of this invention comprises a pair of opposed spaced side walls 1 and 2, a top 3, a bottom 4, and a rear wall 5, all of which are joined to form an integral rectangular box-like structure.

A door 6 is mounted on hinges 7 which are attached to the side wall 2. A glass panel 8 is incorporated into the door such that the door may be closed and the cabinet locked, the glass panel being breakable to provide ready access to the interior of the cabinet when necessary should the door 6 be locked and no key therefor is readily available. The cabinet may be provided with an outwardly projecting peripheral flange 9 which frames the door 6 to adapt the cabinet to be mounted in a recess in the wall of a building.

A fire hose 10 may be attached to a valve 11 or other water connection or standpipe which may be positioned within the cabinet near the top thereof. The standpipe may be arranged within the cabinet, or it may be arranged in the building wall with a connection extending through the cabinet as shown. Although the valve 11 is illustrated as being an angle valve projecting inwardly from the cabinet side wall 1, it may also be mounted in any other suitable position near the top of the cabinet. If desired, the valve 11 may be a straight valve projected downwardly from the top panel 3 (not shown).

The hose 10 may be arranged and supported within the cabinet in a single tier, but where a longer hose is necessary to meet requirements, it may be arranged in two or more tiers, two tiers being specifically shown. The hose 10 extends downwardly from the valve 11 in a vertical span 12, and is then folded back-and-forth between the side panels 1 and 2, Fig. 4, the first layer of hose resting on the arcuate member 13 arranged at the bottom of the cabinet. An arcuate bottom support member 13 is bowed upwardly and is positioned to span or bridge across the entire upper surface of the cabinet bottom 5 between the cabinet side walls 1 and 2. The arcuate member 13 is convex upwardly such that its center is at a higher elevation than its two outer ends. It may be attached permanently to the bottom 4 of the cabinet. The hose is folded back-and-forth upon itself, the center portions of each span or fold lying closely adjacent to each other and rest compactly, one fold upon the other. The weight of the hose is concentrated at the center of each span and the ends of each fold are loosely rounded, as illustrated in Figs. 1 and 4, thus preventing the inner surfaces of the bends or folds from sticking together. The bowed bottom support gives additional space to the end portions of the folds than is given to the center portions thereof.

The hose 10 is folded within the cabinet in one or more vertical layers (two layers or tiers being shown). The rear layer of hose is first folded and packed into the cabinet first, and the front layer or tier is then positioned and folded and packed into the cabinet.

The hose 10, whether in one layer or in two layers, as illustrated in the drawing, is held in position and prevented from falling out of the cabinet when open, by means of a pair of inwardly projecting side flanges 14 and 15 which are attached to the side walls or panels 1 and 2, respectively. The flanges 14 and 15 are mounted in spaced relation with the rear panel 5, Fig. 2, such that the fire hose 10 is arranged in flattened folds, said folds may conveniently lie in the space defined between the side flanges 14 and 15 and the rear panel 5. The flanges 14 and 15 extend vertically from the bottom panel 4 upward to the elevation of the upper folds of the layers of hose 10 such that the hose from the top layer of one tier may be folded over the upper extremity 16, Fig. 3, carried downwardly therefrom in a vertical or diagonal span 12' to the bottom of the cabinet where the folds of a subsequent layer may be initiated. If the cabinet is to contain two layers of hose, there need not be a second set of flanges arranged between the two tiers of folds. The single pair of side flanges 14 and 15 keep the hose from falling and shifting when either one tier or two tiers are employed. The flanges 14 and 15 hold the hose between the cabinet back and the flanges when one tier is used, the front tier holding the rear tier when two tiers are employed. When two tiers are used, the flanges 14 and 15 will still support the rear tier sufficiently to prevent it from falling out of the cabinet. The inner edges of the flanges 14 and 15 are spaced a sufficient distance apart to permit the hose to be withdrawn easily and still retain the tier or tiers in their normal folded position.

The hose folded and packed in layers within the cabinet, as heretofore described, may be quickly withdrawn therefrom by simply removing the end, carrying the nozzle 17, and pulling the hose outwardly of the cabinet. The hose will be withdrawn from the cabinet from the span between the flanges in an orderly manner as the end free of the hose is being pulled to a remote point. After the first layer of hose is withdrawn from the cabinet from between the flanges, the folds of the second layer or tier will likewise be free to be pulled out from behind the flanges, the flanges still retaining the hose of the rear tier after the front tier has been pulled out.

The function of the flanges 14 and 15 is to retain the hose in an impositive manner, the flanges offering a sufficient restraint to support the front of the hose.

The method for packing or storing the hose within the cabinet includes extending the hose downwardly from the valve 11 along one side 1 to the bottom of the cabinet, as shown at 12, Fig. 4. The hose is then laid in horizontal folds across the bottom of the cabinet, and the folds are continued one upon the other, until a vertical tier is completed. After the first tier at the rear of the cabinet has been completed, with the top fold being at a position about coextensive with the top of the flanges 14 and 15, the hose is again extended downwardly to the base of the cabinet, the horizontal folding is again resumed along the arcuate base member 13. The downward span or reach 12 and 12' of the hose 10 extends from the valve to the bottom of the cabinet where the horizontal folding is to commence. The cabinet does not require very much space, since the hose is always flattened, Fig. 2, and the depth of the cabinet is only slightly more than two diameters of the hose.

It may be appreciated that if a cabinet were designed to accommodate a single layer of hose, the flanges 14 and 15 possibly could be somewhat shortened, since the hose, after being carefully folded and packed in the single tier, would require only a very limited support to retain it in place. In any event, the hose, whether in one tier or two, is retained in vertical stacked position and may be easily withdrawn from the space between the flanges. The folds or bends of the hose at the end of each layer are of a substantial radius, and inasmuch as the weight of the hose is applied substantially centrally of the arcuate hose member 13, there is no possibility of the inside of the hose having an inner rubber coating sticking together.

The invention provides a cabinet of more or less substantial configuration for supporting a hose horizontally by stacking the same in one or more vertical tiers. The bends at the end of one are rounded, whereby the upper end of the stacked hose will be relatively straight and even. In cases where the hose is rubber lined, the large radius at each fold prevents the inner lining from sticking and, in any event, prevents the folds from being too sharp and probably cracking the hose when it is stored in the cabinet for a length of time. The hose may be stacked horizontally without any interference as the nozzle end of the hose may be pulled out to unfold the hose and there will be no deleterious effect by such horizontal folding. In fact, the hose, so arranged in the cabinet, will be better preserved and outlast hoses which are arranged in vertical tiers by bending the same over hooks of relatively small diameter. Moreover, the hose requires no more room than a vertically folded hose and the hose may be removed more easily than if a vertically stacked hose were used, particularly of the type which is pivotally connected to the standpipe. Furthermore, the standpipe may not be arranged inside of the cabinet which would be necessary were the vertically stacked swivel type of hose supplied.

The horizontal length of each fold extends from end to end of the cabinet and therefore the flanges 14 and 15 retain the hose in place. The folds of the hose are greater in horizontal length than the width of the restricted opening plus the horizontal length of a single flange so that even though a tier of the hose does not extend completely from one side wall of the cabinet to the other side wall, the hose will still be retained in place by the flanges, even though the tier would shift completely to one side of the cabinet because of shortness of the hose folds and because of shifting of the hose by vibration or otherwise.

Changes may be made in the form, construction and arrangement of the parts without departing from the spirit of the invention or sacrificing any of its advantages, and the right is hereby reserved to make all such changes as fall fairly within the scope of the following claim.

The invention is claimed as follows:

A collapsible fire hose in combination with a storage cabinet for storing same, said cabinet comprising top and bottom walls, a rear wall and a door hingedly mounted to one of said side walls defining a front wall, an arcuate bottom supporting member mounted on said bottom wall, a standpipe mounted in said cabinet near said top wall, and inwardly extending flanges on the forward edges of said side walls defining a restricted opening for normally holding the hose within the cabinet, said flanges extending upwardly from the bottom wall and terminating in spaced relation from said top wall below said standpipe, the depth of said cabinet being such as to hold a plurality of tiers of hose in side-by-side relationship, said hose including a plurality of tiers supported on said supoprting member and adjacent each other wherein the rearmost tier is directly adjacent the rear wall of said cabinet and the opposite ends of the outermost tier are held within the cabinet by said flanges, each tier including a group of superposably arranged hose portions extending between the side walls of said cabinet, the hose portions of said adjacent tiers being connected by a hose portion extending from the top of the rearmost tier to the bottom of the adjacent tier, and one end of said hose portions of the rearmost tier being connected to said standpipe.

References Cited in the file of this patent

UNITED STATES PATENTS

| | | |
|---|---|---|
| 513,265 | Hunter | Jan. 23, 1894 |
| 603,207 | Ruby | Apr. 26, 1898 |
| 677,163 | Wirt | June 25, 1901 |
| 677,993 | Jones | July 9, 1901 |
| 933,069 | Gibbs | Sept. 7, 1909 |
| 1,252,699 | Johnson | Jan. 8, 1918 |
| 1,360,436 | Owen | Nov. 30, 1920 |
| 1,748,234 | Loeb | Feb. 25, 1930 |
| 2,266,334 | Rice | Dec. 16, 1941 |
| 2,686,644 | Pratt | Aug. 17, 1954 |

FOREIGN PATENTS

| | | |
|---|---|---|
| 70,950 | Norway | Sept. 2, 1945 |
| 703,614 | Germany | Mar. 13, 1941 |